United States Patent [19]

Suppes et al.

[11] Patent Number: 5,468,839
[45] Date of Patent: Nov. 21, 1995

[54] HYDROXY-FUNCTIONAL POLYETHER FINISHING PROCESS

[75] Inventors: Galen J. Suppes, Pearland; Hans R. Friedli, Lake Jackson, both of Tex.

[73] Assignee: The Dow Chemical Company, Midland, Mich.

[21] Appl. No.: 81,952

[22] Filed: Jun. 22, 1993

Related U.S. Application Data

[63] Continuation of Ser. No. 857,048, Mar. 24, 1992, abandoned.

[51] Int. Cl.$^6$ .................................................. C08G 59/00
[52] U.S. Cl. ........................ 528/403; 524/376; 252/182.27
[58] Field of Search ................................. 528/403; 524/376; 252/182.27

[56] References Cited

U.S. PATENT DOCUMENTS

| | | | |
|---|---|---|---|
| 2,837,468 | 6/1958 | Ruhf | 203/34 |
| 2,941,963 | 6/1960 | Bailey et al. | 528/421 |
| 2,982,742 | 5/1961 | Smith et al. | 525/403 |
| 2,983,763 | 5/1961 | Krause | 568/608 |
| 3,000,963 | 9/1961 | Speranza | 568/621 |
| 3,016,404 | 1/1962 | Beauchamp et al. | 528/403 |
| 3,251,787 | 5/1966 | Bedoit, Jr. | 521/167 |
| 3,251,788 | 5/1966 | Currier et al. | 521/129 |
| 3,293,193 | 12/1966 | Krahler et al. | 528/95 |
| 3,299,151 | 1/1967 | Wismer et al. | 568/621 |
| 3,715,402 | 2/1973 | Louvar et al. | 536/120 |
| 3,783,147 | 1/1974 | Calicchia et al. | 528/215 |
| 3,823,145 | 7/1974 | Louvar et al. | 544/401 |
| 3,833,669 | 9/1974 | Limburgerhof et al. | 568/621 |
| 3,865,806 | 2/1975 | Knodel | 536/120 |
| 3,892,685 | 7/1975 | Pusey | 521/121 |
| 4,029,879 | 6/1977 | Muzzio | 536/18.3 |
| 4,110,268 | 8/1978 | Longley et al. | 521/177 |
| 4,125,505 | 11/1978 | Critchfield et al. | 260/33.2 R |
| 4,129,718 | 12/1978 | Muzzio | 536/4 |
| 4,137,396 | 1/1979 | Louvar et al. | 536/4 |
| 4,137,398 | 1/1979 | Muzzio | 536/4 |
| 4,284,728 | 8/1981 | Demou et al. | 521/155 |
| 4,306,943 | 12/1981 | Mori et al. | 203/29 |
| 4,329,515 | 5/1982 | Yang et al. | 568/621 |
| 4,355,188 | 10/1982 | Herold et al. | 568/620 |
| 4,426,300 | 1/1984 | Dexheimer et al. | 252/8.9 |
| 4,426,301 | 1/1984 | Dexheimer et al. | 252/8.9 |
| 4,430,490 | 2/1984 | Doerge | 528/77 |
| 4,460,796 | 7/1984 | Mueller | 568/617 |
| 4,468,478 | 8/1984 | Dexheimer et al. | 521/125 |
| 4,469,820 | 9/1984 | Dexheimer et al. | 521/125 |
| 4,482,750 | 11/1984 | Hetzel et al. | 568/621 |
| 4,507,475 | 3/1985 | Straehle et al. | 536/120 |

(List continued on next page.)

FOREIGN PATENT DOCUMENTS

| | | | |
|---|---|---|---|
| 050181 | 4/1982 | European Pat. Off. | C08G 65/30 |
| 0274419 | 7/1988 | European Pat. Off. | C08G 65/32 |
| 2539747 | 7/1984 | France . | |
| 1074249 | 6/1967 | United Kingdom | C08G 23/00 |
| 8806150 | 8/1988 | WIPO | C07C 68/08 |

OTHER PUBLICATIONS

Chemical Abstracts 86:6112K.
Derwent Publicatoin 78–01047A(01).

*Primary Examiner*—Morton Foelak
*Assistant Examiner*—Richard L. Jones

[57] ABSTRACT

A method of preparing a hydroxy-functional polyether comprising contacting (a) a hydroxy-functional polyether containing less than or equal to about 200 ppm of a Group IA or Group IIA metal ion, and (b) an acid. Preferably the contact is carried out under reaction conditions such that a salt, which is not suitable to significantly promote trimerization reactions if the hydroxy-functional polyether is reacted with an isocyanate compound, is formed. The amount of acid is sufficient to essentially neutralize residual basic catalyst without requiring additional solids removal steps prior to use of the hydroxy-functional polyether in various applications, such as production of polyurethanes and related products, in which enhanced trimerization may not be desirable. Additional acid may also be added to convert propenyl ether units present in the polyether's backbone to propionaldehyde and the corresponding diol.

8 Claims, No Drawings

U.S. PATENT DOCUMENTS

| | | | |
|---|---|---|---|
| 4,521,527 | 6/1985 | Frank et al. | 502/184 |
| 4,521,547 | 6/1985 | Anderson | 521/137 |
| 4,521,548 | 6/1985 | Christen et al. | 521/167 |
| 4,528,364 | 7/1985 | Prier | 528/370 |
| 4,535,189 | 8/1985 | Cuscurida | 568/620 |
| 4,677,231 | 6/1987 | Aoshima et al. | 568/617 |
| 4,687,851 | 8/1987 | Laughner | 544/398 |
| 4,704,411 | 11/1987 | Gansow et al. | 521/166 |
| 5,095,061 | 3/1992 | Chavez, Jr. et al. | 524/376 |

5,468,839

HYDROXY-FUNCTIONAL POLYETHER FINISHING PROCESS

CROSS-REFERENCE TO RELATED APPLICATION

This is a continuation of application Ser. No 07/857,048 filed Mar. 24, 1992, now abandoned.

BACKGROUND OF THE INVENTION

The present invention relates to the field of polyol finishing processes. More particularly, it relates to a polyol finishing process having reduced amounts of solid or liquid wastes.

Methods for preparing and finishing polyols are numerous in the art. Commonly a catalyst is used in the polyol preparation process, and such catalyst is typically a basic catalyst such as KOH or another alkali metal hydroxide. In this case it is desirable to remove the catalyst or neutralize it with an acid before using the polyol for a final purpose, since the basicity in the polyol may adversely affect the reaction or reactivity which is sought. Such is especially true when a polyol is to be used to prepare a polyurethane, related product, since the presence of unneutralized catalyst may result in over-catalysis of the reaction desired, e.g., a polyurethane-forming reaction. Weak acids and dilute acids can be used for the neutralization and the resultant salts left in the polyol in some cases, but the salts tend to act as catalysts when the polyol is used in certain reactions such as for polyurethane formation, and enhance the rate of reaction to an undesirable or unacceptable extent.

To counter the undesirable effects of leaving the resultant salts in the polyols, various means of their removal have been developed. For example, processes combining crystallization and filtration allow for removal of the salts. Other known means of removing salts include extraction, for example, washing, and adsorption using various adsorbants including, for example, ion exchange media.

However, the means of removal have some significant disadvantages. One disadvantage is that they require one, or more, separate removal steps following the neutralization, which involves in many cases additional time, equipment expense, solvent expense and the like. The waste salt generally must be disposed of in some manner, necessitating additional cost and, in some cases, causing environmental concerns. Finally, the basic catalyst, e.g., KOH, which has been converted to the salt (which may be a solid or dissolved salt), cannot generally be recycled without expensive techniques.

Accordingly, it would be desirable in the art to have a means of "finishing" a polyol that would preferably reduce processing steps, reduce waste products that must be removed, and allow easier recycle of at least a portion of the basic catalyst.

SUMMARY OF THE INVENTION

Accordingly, the present invention provides a method of preparing a hydroxy-functional polyether comprising contacting (a) a hydroxy-functional polyether containing less than or equal to about 200 ppm of a Group IA or Group IIA metal ion, and (b) an acid. Preferably such contact is carried out under reaction conditions sufficient to form a salt in an amount that it is not suitable to significantly promote trimerization reactions if the hydroxy-functional polyether is reacted with an isocyanate compound.

DESCRIPTION OF THE PREFERRED EMBODIMENTS

The first requirement of the present invention is a hydroxy-functional polyether, which in one embodiment of the present invention is preferably a crude polyol stream. Such polyol or crude polyol stream may be of a wide range of commonly and conventionally known hydroxy-functional polyethers. These include, for example, polyalkylene polyethers having at least one hydroxyl group, preferably, polyalkylene polyether polyols. These polyethers include the polymerization products of oxiranes or other oxygen-containing heterocyclic compounds, such as tetramethylene oxide prepared in the presence of a catalyst and/or initiated by water, and polyhydric alcohols having from about two to about eight hydroxyl groups, amine groups, or other active hydrogen sites. Preferably, the polyethers have at least some oxypropylene units produced from propylene oxide. As is known to those skilled in the art, the propylene oxide can be homopolymerized or copolymerized with one or more other oxiranes or other oxygen-containing heterocyclic compounds. The oxygen-containing heterocyclic compounds are preferably alkylene oxides.

The oxygen-containing heterocyclic compounds, hereinafter exemplified by but not limited to alkylene oxides, are suitably reacted either in mixture or sequentially. When more than one alkylene oxide is used, resulting polyethers can contain random, block, or random-and-block distributions of monomers. Mixtures of alkylene oxides most often produce randomly distributed alkylene oxide units. Sequential addition of different alkylene oxides most often produces blocks of the alkylene oxide segments in a polyether chain.

Exemplary oxiranes suitable for preparation of polyethers include ethylene oxide, propylene oxide, butylene oxide, amylene oxide, glycidyl ethers such as t-butyl glycidyl ether, phenyl glycidyl ether and the like. Other suitable oxiranes include 1,2-butylene oxide, 1,2-hexylene oxide, 1,2-decene oxide, 2-methoxy propylene oxide, methoxy ethylene oxide, 2,3-butylene oxide, 2,3-hexylene oxide, 3,4-decene oxide, 1,1,1-trifluoromethyl-2,3-epoxyoctane, and the like. The polyethers are also prepared from starting materials such as tetrahydrofuran copolymerized with alkylene oxide; epihalohydrins such as epichlorohydrin, epiiodohydrin, epibromohydrin, 3,3-dichloropropylene oxide, 3-chloro-1,2-epoxypropane, 3-chloro-1,2-epoxybutane, 3,4-dichloro-1,2-epoxybutane, 3,3,3-trichloropropylene oxide and the like; arylalkylene oxides such as styrene oxide; and the like. Preferably, the polyethers are prepared from alkylene oxides having from about two to about six carbon atoms such as ethylene oxide, propylene oxide, and butylene oxide.

More preferably, the polyethers are prepared from at least about 10, more preferably at least about 50, and even more preferably at least about 80 percent of an alkylene oxide selected from the group consisting of propylene oxide, 1,2-butylene oxide, 2,3-butylene oxide or mixtures thereof. Most preferably, propylene oxide is selected. Homopolymers of propylene oxide, or copolyethers of propylene oxide with ethylene oxide, butylene oxide and mixtures thereof are most preferred for use in the practice of the invention.

Illustrative alcohols suitable for initiating formation of a polyalkylene polyether include glycerine, ethylene glycol, 1,3-propylene glycol, dipropylene glycol, 1,2-propylene glycol, 1,4-butylene glycol, 1,3-butylene glycol, 1,2-butylene glycol, 1,5-pentane diol, 1,7-heptane diol, 1,1,1-trimethylolpropane, 1,1,1-trimethylolethane, hexane-1,2,6-triol, alphamethyl glucoside, pentaerythritol, erythritol and sorbitol, as well as pentols and hexols. Sugars such as glucose, sucrose, fructose, maltose and the like and compounds derived from phenols such as (4,4'-hydroxyphenyl) 2,2-propane, bisphenols, alkylphenols such as dodecylphenol, octylphenol, decylphenol and mixtures thereof and the like are also suitable for forming polyether polyols useful in the practice of the invention. Mono-alcohols, preferably mono-alcohols having from about 1 to about 18 carbon atoms and alkoxy-substituted mono-alcohols, including methanol, ethanol, isomers of propyl alcohol, isomers of butyl alcohol, and ethers thereof, are also suitable for forming the hydroxy-functional polyethers.

Amines suitable for reaction with oxiranes to form polyethers include aliphatic and aromatic mono- and polyamines, optionally having substituents such as alkyl, carboxyl, carboalkoxy groups and the like. Exemplary aromatic amines include aniline, o-chloroaniline, p-phenylene diamine, 1,5-diaminonaphthalene, methylene dianiline, the condensation products of aniline and formaldehyde, 2,4-diamino toluene, ethylene diamine, toluene diamine and the like. Exemplary aliphatic amines include methylamine, triisopropanolamine, isopropanolamine, diethanolamine, triethanolamine, ethylenediamine, 1,3-propylenediamine, 1,2-propylenediamine, 1,4-butylenediamine, mixtures thereof and the like. Amine based polyols are disclosed in further detail in, for example, U.S. Pat. No. 4,358,547.

The polyethers preferably have an average of from about 1 to about 8, preferably from about 2 to about 4, hydroxyl groups per molecule. The polyethers also are preferably of relatively high molecular weight, having molecular weights ranging from about 88 to about 50,000, preferably from about 1,000 to about 7,500. The term "relatively high molecular weight" as used herein refers to molecular weights in the 1,000 to 7,500 range. The polyethers may also preferably be capped, for example, with ethylene oxide used to cap propylene oxide, as is well-known to those skilled in the art.

The polyethers used in the present invention can be prepared by processes known to those skilled in the arty and are further discussed in, for example, *Encyclopedia of Chemical Technology, Vol. 7*, PP. 257– 262, Interscience Publishers ( 1951 ); M. J. Schick. *Nonionic Surfactants*, Marcel Dekker, New York (1967); British Patent 898,306; and U.S. Pat. Nos. 1,922,459; 2,871,219; 2,891,073; and 3,058,921.

One or more catalysts are advantageously used in the preparation of the hydroxy-functional polyether. Conventional catalysts include alkali or alkaline earth metals or their corresponding hydroxides and alkoxides, Lewis acids, protonic acids, coordination compounds and the like. Thus, such catalysts preferably contain a Group IA or Group IIA metal ion. One skilled in the art can readily determine suitable amounts of alkylene oxides, initiators, catalysts and adjuvants as well as suitable processing conditions for polymerizing the alkylene oxides. Additional sources of detail regarding polymerization of alkylene oxides includes e. g., R. A. Newtons "Propylene Oxide and Higher 1,2-Epoxide Polymers" in *Encyclopedia of Chemical Technology*, 3rd ed., Vol. 10, R. Kirk and D. F. Othmers John Wiley & Sons, New York (1982s) p. 633; D. J. Sparrow and D. Thorpe, "Polyols for Polyurethane Production" in *Telechelic Polymers: Synthesis and Applications* E. J. Goethals, CRC Press, Inc., Boca Raton, Florida (1989), p. 181; J. Furukawa and T. Saegusa, *Polymerization of Aldehydes and Oxides*, Interscience, New York (1963), pp. 125–208, G. Odian, *Principles of Polymerization*, John Wiley & Sons, New York (2nd ed. 1970) pp. 512–521, J. McGrath, ed., *Ring-Opening Polymerization, Kinetics Mechanisms, and Synthesis*, American Chemical Society, Washington, D.C. (1985) pp. 9–21, 137–147 and 204–217, and U.S. Pat. Nos. 2,716,137, 3,317,508; 3,359,217, 3,730,922, 4,118,426; 4,228,310; 4,239,907; 4,282,387; 4,326,047; 4,446,313; 4,453,022; 4,483,941 and 4,540,828; all of which are incorporated herein by reference in their entirety.

Preferred catalysts herein are basic catalyststs, more preferably hydroxides and alkoxides of alkali and alkaline earth metals, particularly cesium, sodium, potassium, barium, strontium and lithium. Potassium hydroxide is more preferred. When alkoxides are used as catalysts, the alkoxy groups advantageously contain from about one to about 36 carbon atoms. Exemplary of such alkoxides are alkoxides having anions of propylene glycol, glycerine, dipropylene glycol, propoxylated propylene or ethylene glycols and the like.

Preferably the crude hydroxy-functional polyether is pretreated to remove excess catalyst. Removal of excess base catalyst is typically desirable because residual catalyst concentrations in the unfinished polyether are generally high, i.e., more than about 500 ppm, since such concentrations are needed to provide the desired rate of alkoxylation in preparing the hydroxy-functional polyether. To simply neutralize such a high level of catalyst may result in formation of a turbid solid/liquid solution, which may in some cases necessitate processing to remove the large amounts of salts produced thereby, particularly when such is necessary to meet solids content specifications. Therefore, it is commercially preferred to use means other than neutralization to remove the large amount of catalyst prior to finishing the polyether according to the present invention. Typically such means employed include extraction, the use of ion exchange resins, and the like, as are known to and practiced by those skilled in the art.

In a preferred embodiment, the excess catalyst is removed to a level of less than or equal to about 200 ppm, more preferably less than or equal to about 50 ppm, and most preferably less than or equal to about 10 ppm.

Following removal of excess catalyst, if desired, the hydroxy-functional polyether is then ready for use in the practice of the present invention, in which the hydroxy-functional polyether is contacted with an acid. This acid is preferably any acid that forms a salt with a Group IA or Group IIA metal containing catalyst. The salt resulting from neutralization with the acid is preferably one that does not significantly promote trimerization reactions if or when the polyether is reacted with an isocyanate compound, such as when the reaction is carried out to make a polyurethane or polyurea material. This means that the degree of trimerization is not great enough to cause deleterious effects that make it desirable to perform additional processing to remove the salt.

The resulting salt preferably, therefore, has an anion of a Bronsted acid having a pKa of less than about 1. For this purpose Lewis acids, protonic acids and many other acids known to those skilled in the art are suitable. Among the acids suitable for use are, for example, hydrochloric, dodecylbenzenesulfonic, naphthalene sulfonic, trichloroacetic, sulfuric, perchloric, nitric, benzene sulfonic, toluene sulfonic, methane sulfonic, hydrofluoric, phosphoric, formic, acetic, lactic, carbonic, hexanoic and hypophosphorous acid, mixtures thereof and the like. Monoprotic (basic) acids can be added at stoichiometries relative to the metal ion of preferably less than but approaching 1.0. For diprotic or triprotic acids, it is desirable to use an acid level which results in a pH in the polyol of as close to neutral as possible.

Thus, neutral is defined herein as the pH at which there is no excess acid, base or salt. To achieve this level, it is preferred that, for diprotic acids the stoichiometry is from about 0.55 to about 0.9, and for triprotic acids, from about 0.7 to about 0.95 moles acid to moles base.

It is important that the acid selected be either soluble in the hydroxy-functional polyether or of such low concentration as to form a stable suspension above the solubility level. The solubility of the salt formed by reaction of the acid and the metal ion in part determines the concentration of salt which will remain in solution and provide a consistent and non-turbid solution. Typically, a salt will remain suspended at concentrations of up to about 400 ppm above their solubility limit. The stability of such supersaturating salts is also related to crystal size. Therefore, even though a salt may have minimal impact on performance of the polyether in a given application at supersaturated concentrations, it is desirable that such concentration be less than that at which the salt readily falls out of solution. Thus it is preferred that the product polyether has a stable salt content which results in negligible impact on performance in applications where trimerization is undesirable.

It is an advantage of the present invention that the acid can be used for two purposes. First, an amount of acid can be added that is sufficient to neutralize the basic catalyst. Second, a relatively small proportion of excess acid can be concurrently added. The excess acid advantageously serves to catalyze the conversion of propenyl polyether units, present in the hydroxy-functional polyether backbone, to propionaldehyde and the corresponding diol. Since propenyl polyether units may contribute to discoloration of flexible polyurethane foams prepared using high temperature processing therefrom, or cause other difficulties in other types of processing for which the polyol is to be used, this conversion is in many cases desirable. Such is discussed further in copending U.S. Pat. No. 5,095,061, issued Mar. 10, 1992, incorporated herein by reference in its entirety. Preferably the excess amount is less than about 30 ppm, preferably less than about 25 ppm, i.e., 0.03 to about 5.5 milliequivalents of acid per kilogram of hydroxy-functional polyether (meq acid/kg polyether), more preferably from about 0.1 to about 1.5 meq acid/kg polyether, and most preferably from about 0.3 to about 0.5 meq acid/kg polyether, wherein the acid has an aqueous pKa value of less than about 2.13. In general the amount of acid to be used is determined in part by the acid's pKa, since the amount of propenyl polyether hydrolyzed is inversely proportional to the pKa of the acid catalyst selected, i.e., lower pKa acids tend to produce high levels of hydrolysis, while higher pKa acids show reduced hydrolytic activity and therefore higher amounts of propenyl polyethers remaining in the final product. While it is possible to use a different acid for the conversion of the propenyl ether units present in the polymer backbone to propionaldehyde and the corresponding diol, for convenience it is, obviously, desirable to simply add a small excess of the same acid used for the neutralization and salt formation. Thus, preferably the acid selected for conversion has the same aqueous pKa value of less than 1. If a different acid is used for the secondary propenyl ether conversion step, acids selected of pKa's less that about 5, preferably less than about 2, still more preferably less than about 1.5, and most preferably less than about 1.

Following addition of the acid catalyst the hydroxy-functional polyether/acid catalyst mixture is allowed to react for a time sufficient to allow the conversion of any propenyl polyethers present therein to propionaldehyde. Preferably the mixture is allowed to react from about 5 to about 120 minutes. Those skilled in the art will balance reaction time with other reaction variables to achieve desired results, and will know to determine the degree of conversion to propionaldehyde by analyzing the product for either propionaldehyde or propenyl polyether content. The rate constant for this reaction is on the order of about 1,000 liters per mole-minute at about 85° C. The contact time is preferably balanced with temperature to avoid degradation of the hydroxy-functional polyether. Degradation can result in discoloration of the product and/or a reduction in the product's reactivity to isocyanate in polyurethane manufacture. As is known to those skilled in the art, the volatility of the acid should be taken into account in selecting the pressure. A wide range of pressures can therefore be used, and can be easily ascertained by the skilled routineer.

The reaction of the acid and the hydroxy-functional polyether is also preferably carried out at an elevated temperature. This temperature is preferably determined by the acid concentration and residence time in the reaction vessel. For most purposes the temperature is preferably in a range of from about 25° C. to about 200° C., more preferably from about 50° C. to about 150° C., and most preferably from about 90° C. to about 120° C.

Another advantage of the present invention is that, since excess acid beyond the amount required to achieve neutrality as defined can be added to reduce the propenyl ether content, it is not necessary to control the acid addition for the neutrality as precisely as with some other methods. Rather, an acid scavenger can be used following the hydrolysis step to remove any excess acid present. Preferably, this acid scavenger is an epoxy compound which substantially scavenges the excess. As used herein, the term "substantially" means that at least about 85 percent of the acid of weight is preferably scavenged, more preferably at least about 90 percent, and most preferably at least about 95 percent. The epoxy compound can be selected from the group consisting of monoepoxide and polyepoxide compounds including alkylene oxides such as butylene oxide (all isomers), propylene oxide, ethylene oxide, styrene oxide and the like, as well as glycidyl ethers such as cresyl glycidyl ethers, phenylglycidyl ether and the like; epoxy resins, including those formed from epichlorohydrin and bisphenols, such as bisphenol A and bisphenol F and the like, as well as aliphatic and cycloaliphatic epoxy resins such as epoxycyclohexylmethyl epoxycyclohexyl carboxylates; epoxidized soybean oils, cresol resins; Novolac resins; mixtures thereof and the like.

The epoxy compounds preferably have structures represented by Formula 1:

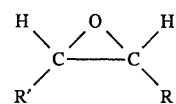
Formula 1 wherein R and R' (referred to hereinafter as R groups) are independently hydrogen or inert groups or R and R' together form an inert cyclic structure. Inert groups are groups which do not significantly reduce polyether stability under conditions suitable for scavenging the acid. Suitable inert groups include, for instance, additional epoxy groups, halogens, ester, alkyl, aryl, aralkyl, cycloalkyl, alkoxy, and aryloxy, aralkoxy and cycloalkoxy groups, which groups are unsubstituted or substituted by inert groups. Suitable halogens are chlorine, bromine, fluorine and iodine. Preferably R and R' together have fewer than about 60 carbon atoms. When R and R' together form an inert cyclic structure, that structure is preferably a cyclohexyl ring having inert groups as substituents. Preferably, the weight percent of oxirane oxygen in the epoxy compound is from about 3 to about 30, more preferably from about 6 to about 12 percent.

Epoxy compounds having more than one epoxy group preferably have molecular weights of from about 100 to about 1,000. Preferred epoxy compounds are epoxy compounds other than the alkylene oxides used in preparation of the polyether, such as ethylene oxide, propylene oxides and butylene oxides, and include other monoepoxy compounds and epoxy resins. Epoxy resins, i.e., molecules which have at least two glycidyl groups and which cure readily with amines, are particularly preferred.

Preferably, the epoxy compound is added in an amount sufficient to scavenge the acid catalyst, preferably from about 1 to about 300 epoxy equivalents (eq) per 1 acid catalyst eq, more preferably from about 5 to about 100 epoxy eq per acid catalyst eq, and most preferably from about 10 to about 50 epoxy eq per acid catalyst equivalent. The term "epoxy equivalent" as used herein means that amount of epoxy compound which contains an average of one epoxy group. The term "acid catalyst equivalent" as used herein means that amount of acid catalyst which contributes an average of one hydrogen ion in aqueous solution. An advantage of the present invention is that proportionately very little soluble acid catalyst is needed to convert virtually all of the propenyl polyether to propionaldehyde, and therefore very little epoxy compound is needed to scavenge the acid. Thus, contamination of the end product hydroxy-functional polyether is reduced or eliminated.

Contact of the epoxy compound and acid in the hydroxy-functional polyether preferably occurs at a temperature that is sufficient for reaction of the epoxy compound to reduce acidity, but insufficient to result in undesirable degradation of the polyether. A sufficient temperature is preselected such that the acidity is reduced within a time acceptable for a specific application. Preferably, the temperature is from about 0° C. to about 150° C., more preferably from about 50° C. to about 135° C., and most preferably from about 110° to about 130° C. These temperatures are suitably maintained for a time sufficient for the epoxy compound to react with the acid, preferably for at least about 1 minute, more preferably for from about 20 to about 120 minutes. As is known to those skilled in the art, temperature and residence time are preferably balanced to achieve the desired degree of removal of the acid catalyst.

Conditions suitable for reaction of the hydroxy-functional polyether with the epoxy compound are preferably avoided. For instance, materials known to catalyze the reaction of epoxy compounds with hydroxy-functional polyethers are preferably substantially absent or, at most, present in insufficient quantities to result in significant reaction. It is also preferred that the conditions of temperature and pressure to which the polyether is exposed are not sufficient to interfere undesirably with acidity reduction or to measurably alter the physical properties of the polyether.

According to the present invention, the epoxy compound and polyether are contacted or admixed using conventionally known mixing apparatus. Local concentrations of epoxy compound are advantageously and conveniently avoided by thorough mixing. The mixing can be carried out batchwise or continuously in accordance with procedures within the skill of those in the art.

Following addition of the epoxy compound to scavenge the acid, it is preferable to remove the propionaldehyde and water. To accomplish this the hydroxy-functional polyether is preferably stripped according to means and methods generally known to those skilled in the art. For example, counter-current steam stripping using 2 percent steam with vacuum stripping at 65 mm Hg vacuum and about 120° C. is an effective means of substantially removing the propionaldehyde. Counter-current stripping using other inert gases, for example. nitrogen, is also suitable. As used herein, the term "substantially" means that at least about 85 percent by weight of the propionaldehyde and water is preferably removed, more preferably at least about 90 percent, and most preferably at least about 95 percent.

Following the acid neutralization of the present invention, which may in some cases be desirably coupled with hydrolysis using excess acid to convert the propenyl ethers to propionaldehyde, the resultant product is a hydroxy-functional polyether generating less waste, particularly solids. This is because the salts formed in neutralizing the basic catalyst by using specific acids, e.g., salts that do not promote trimerization reactions, do not require removal before the hydroxy-functional polyether can be used for purposes wherein trimerization is involved or is a potential side reaction, e.g., formation of polyurethanes, and the like. Thus, the resultant polyether product will not exhibit a catalytic effect, increasing trimerization, that is detrimental to the process in which the product is being employed. Since removal of the resultant salts, which are preferably present in small amount because of the reduction in catalyst level prior to the hydrolysis step, is not necessary, the need to use or build, filters, filter aid pots, pumps, rundown tanks, associated piping, etc., for finishing facilities is eliminated. At the same time solid waste handling is reduced and disposal problems eliminated. Finally, if a substantial amount of residual catalyst is removed prior to reaction with the acids, the catalyst, e.g., KOH, is therefore almost fully recyclable.

The following examples are given to illustrate the present invention and are not intended to be, nor should they be construed as being, limitative of its scope. All parts and percentages are by weight unless otherwise indicated.

COMPARATIVE EXAMPLE 1

A crude, experimental glycerine-initiated, ethylene oxide/propylene oxide heterofed polyether triol (designated Polyol A), having a molecular weight of about 3,100, is prepared using conventional methods and using potassium hydroxide to initiate the alkoxylation. An extraction is carried out to remove excess potassium hydroxide to a level of about 50 ppm.

The polyol is then mixed with an aqueous solution of hydrochloric acid in a static mixer reactor which approaches plug flow behavior for about 10 minutes at 120° C. 1,200 lb. of crude polyether triol are processed with this static mixer to produce an intermediate product containing about 5,000 ppm watery 35 ppm potassium, and 46 ppm chloride.

About 500 ppm of 3,4-epoxy cyclohexyl methyl- 3,4-epoxy cylohexylcarboxylate resin is added to the mixture to scavenge the excess acid. It is reacted for about 1 minute and then water is stripped from the polyol to reach a level of about 500 ppm. Finally, butylated hydroxytoluene (BHT) and 4,4-di( α-dimethylbenzyl diphenylamine) are added in amounts of 4,500 ppm and 2,000 ppm, respectively, to serve as oxidation inhibitors. The final product has a potassium level of about 34 ppm.

A control polyol, designated Polyol B, is also prepared, starting with the same crude polyol (glycerine-initiated, ethylene oxide/propylene oxide heterofed polyether triol, having a molecular weight of about 3,100, prepared using conventional methods and using potassium hydroxide to initiate the alkoxylation), which has been subjected to an extraction to remove the excess potassium hydroxide to a level of about 50 ppm. Howevery treatment with hydrochloric acid and the epoxy resin is not carried out at this point, but rather, the polyol is processed through a filter using magnesium silicate and perlite filter aid to reduce the potassium to less than about 5 ppm. About 10 ppm HCl acid is then added to neutralize the potassium hydroxide such that about 8 ppm excess acidity is present. Additional processing, including removal of water and addition of BHT and 4,4-di($\alpha\alpha$-dimethylbenzyl diphenylamine), are carried out exactly as with the experimental polyol.

The experimental polyol and the control polyol are then used to prepare polyurethane foams using the polyol formulation shown in Table 1 below.

TABLE 1

| Component | Amount in parts per 100 parts of polyol | Pounds per minute (lb./min. throughput) |
|---|---|---|
| Polyol A[1] | 100 | 110.0 |
| Polyol B[2] | 100 | 110.0 |
| Amine Catalyst[2] | 0.48 | 0.41 |
| Tin Catalyst[4] | 0.71 | 0.60 |
| Water | 7.5 | 6.38 |
| Silicone Surfactant[5] | 1.2 | 1.02 |
| Toluene diisocyanate[6] | 79.3 | 67.4 |

[1]Polyol A is a glycerine-initiated, ethylene oxide/propylene oxide heterofed polyol having a molecular weight of about 3,100.
[2]Polyol B is essentially the same as Polyol A, but processed by conventional methods.
[3]Amine Catalyst is DABCO-8264*, which is available from Air Products and Chemicals, Inc.
[4]Tin Catalyst is T-95 stannous octoate, available from Air Products and Chemicals, Inc.
[5]Silicone Surfactant is DC-5160, available from Air Products and Chemicals, Inc.
[6]Toluene diisocyanate is an 80/20 blend of 2,4'- and 2,6'-toluene diisocyanate, respectively.

All components of each formulation, each containing either Polyol A or Polyol B, are processed on a VARIMAX* foaming machine, available from Periphlex, Inc., at an isocyanate index of 98 using conventional methods. Processing conditions include a head pressure of 5 psi; trough plate setting of 25.1; pivot one plate setting of 13.9; pivot two plate setting of 9.9; pivot three plate setting of 5.3; pivot four plate setting of 0.1; converter revolutions per minute (rpm) of 900; mixer rpm of 500; trough size of 24 liters; width of 54 inches; run time of 1.0 minute; converter speed of 13.0; and total height of 34 inches.

Physical property tests are conducted on the resultant box foams, and compared in Table 2.

TABLE 2

| Property | Polyol A | Polyol B* |
|---|---|---|
| Air flow (cubic feet/minute, cfm) | 5.1 | 5.1 |
| Compression Set (90% at 70° C.) | 3.4 | 3.5 |
| Density (lb/ft$^3$) | 1.51 | 1.5 |
| Internal Force Deflection | | |
| 25% | 44.1 | 45.3 |
| 65% | 78.3 | 77.3 |

TABLE 2-continued

| Property | Polyol A | Polyol B* |
|---|---|---|
| Return to 25% | 28.5 | 28.9 |
| Flexural Modulus | 1.78 | 1.71 |
| % Hysteresis | 64.6 | 63.8 |
| Resiliency (%) | 46 | 45 |
| Tear Strength (pli) | 3.5 | 3.2 |
| Tensile Strength (psi) | 20.3 | 19.1 |
| Elongation (%) | 213 | 214 |

*Not an example of the present invention

COMPARATIVE EXAMPLE 2

Another crude experimental polyol, designated Polyol C, is prepared. It is a sucrose/glycerine-co-initiated, ethylene oxide/propylene oxide heterofed polyol of about 3,500 molecular weight and average functionality of greater than about 3. The polyol is prepared using a standard alkoxylation with potassium hydroxide as a catalyst. Following reaction to form the polyol, an extraction is carried out to remove excess potassium hydroxide to a level of about 50 ppm.

The polyol is then mixed with an aqueous solution of hydrochloric acid in a static mixer which approaches plug flow behavior for about 10 minutes at 120° C. 1,200 lb. of crude polyether polyol are processed with this static mixer to produce an intermediate product containing about 5,000 water, 19 ppm potassium, and 26 ppm chloride.

About 500 ppm of 3,4-epoxy cyclohexyl methyl- 3,4 epoxy cylohexyl carboxylate resin is added to the mixture to scavenge the excess acid. It is mixed for about 1 minute and then water is stripped from the polyol to reach a level of about 500 ppm. Finally, butylated hydroxytoluene (BHT) and 4,4-di($\alpha\alpha$-dimethylbenzyl diphenylamine) are added in amounts of 5,000 ppm and 1,500 ppm, respectively, to serve as oxidation inhibitors. The final product has a potassium level of about 19 ppm.

A control polyol, designated Polyol D, is also prepared, starting with the same crude polyol (sucrose/glycerine-co-initiated, ethylene oxide/propylene oxide heterofed polyether triol, having a molecular weight of about 2,400, prepared using conventional methods and using potassium hydroxide to initiate the alkoxylation), which has been subjected to an extraction to remove the excess potassium hydroxide to a level of about 27 ppm. However, treatment with hydrochloric acid and the epoxy resin is not carried out at this point, but rather, the polyol is processed through a filter using magnesium silicate and perlite filter aid to reduce the potassium hydroxide to about 1 ppm. No additional acid is added thereafter. Additional processing, including removal of water and addition of butylated hydroxytoluene (BHT) and di($\alpha,\alpha$-dimethylbenzyl diphenylamine), are carried out exactly as with the experimental Polyol C.

The experimental polyol, Polyol C, and the control polyol, Polyol D, are then analyzed to determine certain properties known to affect reactivity in polyurethane processing. Table 4 shows the results.

TABLE 4

| Property | Polyol C | Polyol D* |
|---|---|---|
| Percent OH | 1.47 | 1.44 |

TABLE 4-continued

| Property | Polyol C | Polyol D* |
|---|---|---|
| pH | 7.0 | 8.6 |
| Viscosity at 100° F. (cps) | 350 | 346 |
| Epoxy (ppm) | 500 | 0 |
| Potassium (ppm) | 19 | 1 |
| Chloride (ppm) | 25 | nd |

*Not an example of the present invention.
"nd" means not detectable.

The experimental polyol and the control polyol are then used to prepare polyurethane foams as described in Comparative Example 4.

COMPARATIVE EXAMPLE 2

About 0.5 g amounts of various potassium compounds (identified in Table 7) are added to individual samples (20 ml each) of a polyol identical to Polyol A of Comparative Example 1. This polyol has been treated according to the process of the present invention to neutralize the KOH to a level of about 25 ppm, and also contains 2,000 ppm water. Oxidation reduction additives have not been used. The individual mixtures are placed in open 100 ml tripours in an oven at 110° C. Color formation is observed and recorded in Table 5. Ultraviolet (uv) light analysis is done using a 0.5 cm sapphire cell, at ambient temperature on certain samples at 340 nanometers (nm) absorbance and recorded in Table 6.

TABLE 5

| Potassium Compound | 1 hr | 2 hr | 24 hr | 48 hr | 72 hr |
|---|---|---|---|---|---|
| KOH | Tan/brown | Brown | Brown/Tan | Brown/Red | Red |
| $KHSO_4$ | Clear | Clear | Yellow | Tan | Tan |
| $KC_2H_3O_2$ | Clear | Clear | Clear | Tan | Tan |
| $KCHO_2$ | Clear | Clear | Clear | Yellow | Yellow |
| $K_2HPO_4$ | Clear | Clear | Clear | Yellow | Yellow |
| KCl | Clear | Clear | Clear | Clear | Clear |
| $KH_2PO_4$ | Clear | Clear | Clear | Clear | Clear |

TABLE 6

| Potassium Compound | 2 hr | 24 hr | 48 hr | 72 hr |
|---|---|---|---|---|
| KOH | 0.375 | >3.0 | * | * |
| $KHSO_4$ | 0.075 | 1.840 | 3.200 | * |
| $KC_2H_3O_2$ | — | 0.225 | 0.920 | * |
| $KCHO_2$ | — | 0.100 | 0.580 | 1.290 |
| $K_2HPO_4$ | — | 0.100 | 0.418 | 0.815 |
| KCl | — | 0.050 | 0.142 | 0.216 |
| $KH_2PO_4$ | 0.015 | 0.100 | — | — |

*absorbance tested but not detectable.
— not measured

COMPARATIVE EXAMPLE 3

Three separate portions of a polyol identical to Polyol C of Comparative Example 2 are prepared, except that the KOH level is about 170 ppm, water content is about 2,000 ppm, and no oxidation reduction additives are used. The portions are treated as follows:

Portion 1: This sample (about 250 g) is placed on a rotary evaporator for about 30 minutes at full vacuum and 120° C. Vacuum is then held over the sample for about 15 minutes until the temperature is reduced to below about 80° C. About 30 ml of the solution is then placed in a 100 ml tripour and the tripour is placed in an oven at 125° C.

Portion 2: This sample (about 238.1 g) is mixed with 0.7226 g of 1.0007 N HCl (about 1.0 stoichiometry). Processing is continued as with Portion 1.

Portion 3: This sample (about 271.6 g) is mixed with about 0.0949 g of 80 percent by weight phosphoric acid (about 1.0 stoichiometry). Processing is continued as for Portion 1.

Ultraviolet (uv) light analysis is done on the portions at 340 nm absorbance and recorded in Table 7. At the time of 1200 minutes the KOH solution has a yellow color, while both neutralized samples are colorless.

TABLE 7

| Potassium Compound | 0 min. | 20 min. | 90 min. | 165 min. | 200 min. |
|---|---|---|---|---|---|
| KOH* (Portion 1) | 0.046 | 0.087 | 0.192 | 0.259 | 0.954 |
| KCl (Portion 2) | 0.122 | 0.118 | 0.132 | 0.145 | 0.564 |
| $KH_2PO_4$ (Portion 3) | 0.090 | 0.088 | 0.096 | 0.104 | 0.377 |

*not an example of the present invention.

COMPARATIVE EXAMPLE 4

Neutralization of portions of a polyol identical with Polyol C of Comparative Example 2 is carried out according to the process of the present invention. Eight different neutralizing agents are employed (toluene sulfonic acid (TSA), lactic acid, acetic acid, formic acid, dodecylbenzene sulfonic acid (DBSA), methane sulfonic acid (MSA), and hydrochloric acid (HCl)), and a control experiment in which no salts are present. Additional testing is done in which KCl is added to the polyol. Two samples are run using hydrochloric acid, with the run designated as "HCl #1" being performed on polyol which has been first extracted to reduce the catalyst, prior to neutralization, using toluene sulfonic acid. The run designated as "HCl #2" did not receive the prior extraction. In each case the potassium salt of the neutralizing agent is allowed to remain in the polyol at a level of about 100 ppm. Each of the six samples is then used in the process described in Example 1 to prepare a foam according to the formulations shown in Table 8, using an isocyanate index of about 95.

TABLE 8

| Component | Amount in parts per 100 parts of polyol |
|---|---|
| Polyol C[1] | 100 |
| Amine Catalyst[2] | 0.12 |
| Tin Catalyst[3] | 0.18 |
| Water | 6 |
| Silicone Surfactant[4] | 1.1 |
| Toluene diisocyanate[5] | 62.2 |

[1] Polyol C is a sucrose/glycerine-co-initiated, ethylene oxide/propylene oxide heterofed polyol having a molecular weight of about 3,500 and an average functionality greater than about 3.
[2] Amine Catalyst is DABCO-8264*, which is available from Air Products and Chemicals, Inc..
[3] Tin Catalyst is T-9*, stannous octoate, available from Air Products and Chemicals, Inc.
[4] Silicone Surfactant is TEGOSTAB BF-2370*, available from Goldschmidt Chemical Corporation.

TABLE 8-continued

| Component | Amount in parts per 100 parts of polyol |
|---|---|

[5]Toluene diisocyanate is an 80/20 blend of 2,4'- and 2,6'-toluene diisocyanate, respectively.

Processing is done to prepare laboratory scale box foam, using a total reactants charge of about 600 g for each and foaming in a 15×15×9 inch lined box. Physical properties are measured and recorded in Table 9.

TABLE 9

| Property | Control* | TSA | KCl | Lactic Acid | Acetic Acid | Formic Acid | DBSA | MSA | HCl#1 | HCl#2 |
|---|---|---|---|---|---|---|---|---|---|---|
| Cream Time (sec.) | 15 | 15 | 15 | 13 | 15 | 16 | 16 | 15 | 15 | 16 |
| Blow Off Time (sec.) | 79 | 80 | 79 | 76 | 75 | 75 | 79 | 80 | 76 | 78 |
| Airflow (cubic feet/minute, cfm) | 4.4 | 4.0 | 4.2 | 3.8 | 4.2 | 4.5 | 3.6 | 4.0 | 3.6 | 3.5 |
| Compression Set (90% at 70° C.) | 10.3 | 8.6 | 9.2 | 10.7 | 10.6 | 10.3 | 7.0 | 9.4 | 7.2 | 7.7 |
| Density (lb/ft$^3$) | 1.216 | 1.199 | 1.204 | 1.202 | 1.190 | 1.197 | 1.215 | 1.193 | 1.218 | 1.207 |
| Internal Force Deflection | | | | | | | | | | |
| 25% | 32 | 35 | 33 | 33 | 31 | 29 | 37 | 33 | 36 | 37 |
| 65% | 54 | 58 | 56 | 56 | 52 | 50 | 61 | 56 | 63 | 63 |
| Return to 25% | 18 | 20 | 19 | 19 | 18 | 17 | 22 | 19 | 22 | 22 |
| Flexural Modulus | 1.69 | 1.66 | 1.67 | 1.71 | 1.70 | 1.72 | 1.67 | 1.71 | 1.74 | 1.67 |
| % Hysteresis | 57.6 | 57.4 | 58 | 59 | 59 | 58 | 59 | 57 | 61 | 59 |
| Resiliency (%) | 41 | 41 | 41 | 40 | 41 | 41 | 42 | 42 | 44 | 42 |
| Tear Strength (pli) | 1.66 | 2.09 | 2.09 | 1.91 | 1.83 | 1.58 | 1.55 | 1.71 | 1.86 | 2.08 |
| Tensile Strength (psi) | 12.2 | 13.1 | 13.7 | 13.5 | 12.6 | 11.2 | 14.6 | 11.6 | 11.7 | 13.6 |
| Elongation (%) | 147 | 142 | 156 | 152 | 148 | 131 | 150 | 144 | 132 | 155 |

*Not an example of the present invention

COMPARATIVE EXAMPLE 5

Two 1,000 ml samples of a polyol identical to Polyol A are prepared using the process of the present invention such that the KOH content is reduced to 27 ppm. The polyol samples are kept at a temperature of 100° C. One sample is used as a control. The other sample is placed in a 1,000 ml plastic container and 5 g of butylated hydroxytoluene (BHT) is added to it and stirred.

After about 30 seconds a blue tint is observed in the BHT-containing sampler while the control sample remains clear. After about 10 minutes the color in the BHT-containing sample is lime green. The control sample remains clear.

What is claimed is:

1. A method of preparing a hydroxy-functional polymer consisting essentially of contacting (a) a hydroxy-functional polyether containing a Group IA or Group IIA metal ion in an amount up to about 200 ppm, and (b) an acid which is either soluble in the hydroxy-functional polyether or which is present in a concentration such that it forms a stable suspension in the hydroxy-functional polyether above the solubility level, in an amount that is sufficient to neutralize the basic catalyst such that a salt is formed, said salt being formed in an amount that is (a) insufficient to significantly promote trimerization reactions if the hydroxy-functional polyether is reacted with an isocyanate compound, and (b) soluble or forming a stable suspension in the hydroxy-functional polyether above its solubility level.

2. The method of claim 1 wherein the hydroxy-functional polyether is a polyether prepared from an alkylene oxide having from 2 to 6 carbon atoms.

3. The method of claim 1 wherein the Group IA or Group IIA metal ion is potassium, sodium, barium, or a mixture thereof.

4. The method of claim 1 wherein the acid is hydrochloric, dodecylbenzene sulfonic, naphthalene sulfonic, trichloroacetic, sulfuric, perchloric, nitric, benzene sulfonic, toluene sulfonic, methane sulfonic, hydrofluoric, phosphoric, formic, hexanoic, lactic, acetic, carbonic or hypophosphorous acid, or a mixture thereof.

5. The method of claim 4 wherein the acid is hydrochloric, dodecylbenzene sulfonic, methane sulfonic, acetic, formic or phosphoric acid, or a mixture thereof.

6. The method of claim 1 wherein the acid has a pKa of less than about 5.

7. The method of claim 1 wherein the acid has a pKa of less than about 2.

8. The method of claim 1 wherein the acid has a pKa of less than about 1.

* * * * *